United States Patent [19]

Kieffer et al.

[11] 4,028,570

[45] June 7, 1977

[54] SELF LOCKING MOLDED THERMOSTAT STRAP

[75] Inventors: Vernon E. Kieffer, St. Louis; Billy L. Damon, Manchester, both of Mo.

[73] Assignee: Emerson Electric Co., St. Louis, Mo.

[22] Filed: June 18, 1975

[21] Appl. No.: 587,823

[52] U.S. Cl. .............................. 310/68 C; 310/71
[51] Int. Cl.² ...................................... H02K 11/00
[58] Field of Search ............ 310/68, 68 C, 71, 66, 310/180, 184, 198, 194, 43, 260; 339/91; 336/107, 192; 165/11; 318/242

[56] References Cited

UNITED STATES PATENTS

| | | | |
|---|---|---|---|
| 3,127,531 | 3/1964 | Tethoro | 310/68 C |
| 3,246,183 | 4/1966 | Slonneger | 310/68 |
| 3,457,442 | 7/1969 | Charlton | 310/71 |
| 3,515,917 | 6/1970 | Kolb | 310/71 |
| 3,748,510 | 7/1973 | McNeal | 310/68 C |
| 3,842,297 | 10/1974 | Pleiss | 310/68 C |
| 3,926,497 | 12/1975 | Eigenbrode | 339/91 |

*Primary Examiner*—R. Skudy
*Attorney, Agent, or Firm*—Polster and Polster

[57] ABSTRACT

A molded thermstat strap is provided having a central thermostat receiving well. The strap is intended for insertion between the windings of a dynamoelectric machine, for example, an electric motor, during manufacture of the motor so that a thermostat element can be positioned between the windings after motor construction is completed. The strap includes a central well having wing members extending outwardly from opposite sides of the well. Means for removably locking a thermostat within the well is formed integrally with the strap. Means also is provided for holding the strap positionally secured in relation to the motor windings so that the strap does not move during motor constructional steps accomplished after placement of the strap between the motor windings.

11 Claims, 6 Drawing Figures

U.S. Patent   June 7, 1977   Sheet 2 of 2   4,028,570
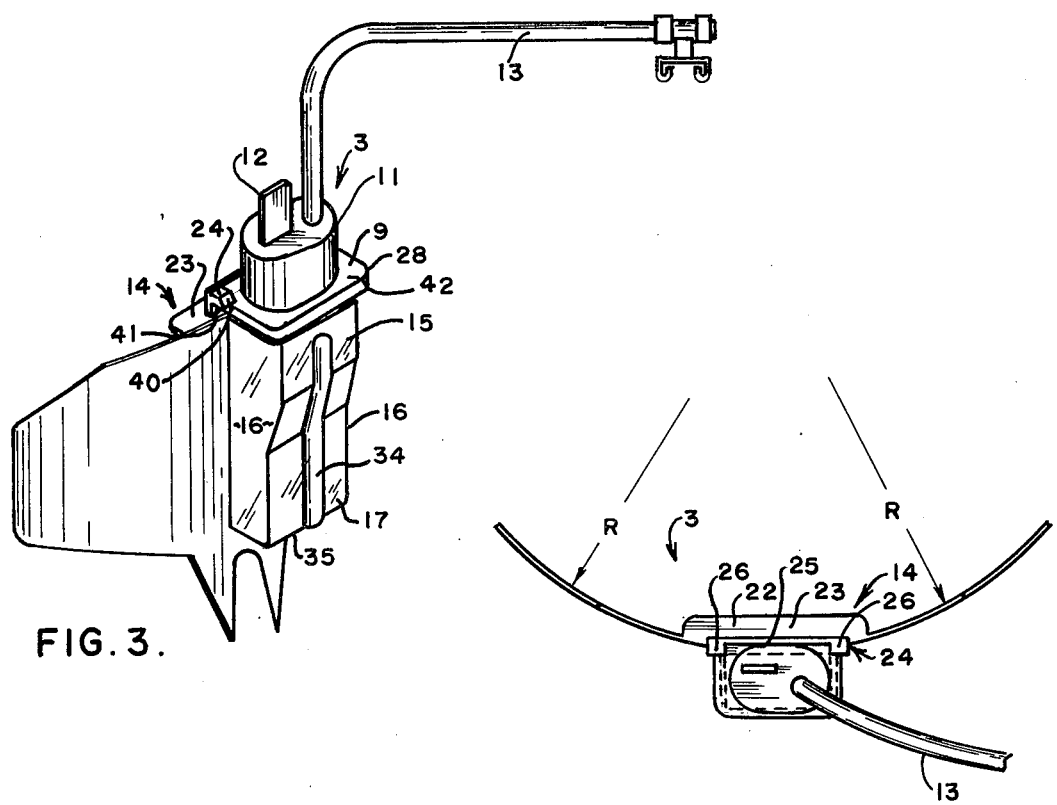
FIG. 3.
FIG. 4.
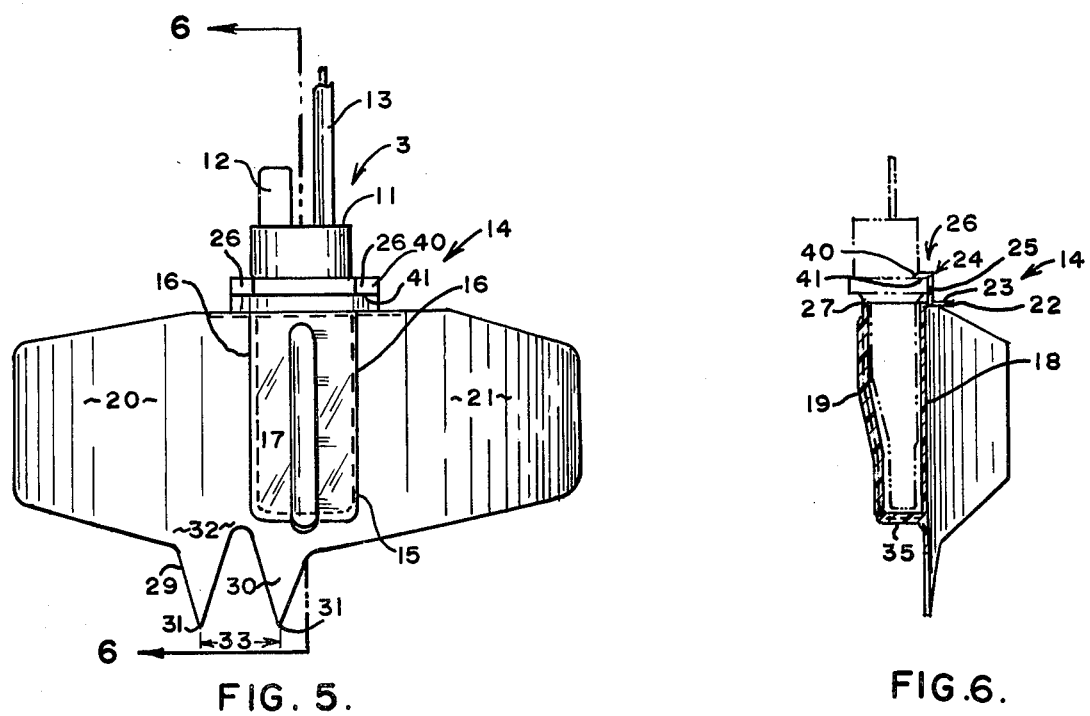
FIG. 5.
FIG. 6.

SELF LOCKING MOLDED THERMOSTAT STRAP

BACKGROUND OF THE INVENTION

This invention generally relates to dynamoelectric machines, for example, electric motors, and in particular, is directed toward an improved thermostat strap which is inserted between the windings of the motor during motor construction. While the invention is described in particular detail with respect to a single phase induction motor, those skilled in the art will recognize the wider applicability of the invention disclosed hereinafter.

Many single phase induction motors utilize some kind of motor over temperature protection device which functions to open the motor winding circuit whenever an over temperature condition in the winding is sensed. The over temperature protection device generally is electrically connected in series with the source of electrical energy for operating the motor, and is positioned physically between the motor windings so that heat transfer occurs between the windings and the protection device. Consequently, both the current drawn through the device and the surrounding winding temperature are used as inputs to enable the device to exhibit relatively fast response time following an over temperature condition.

Single phase induction motors commonly include a stator assembly constructed from a plurality of individual laminations formed from magnetic material. The laminations include a central opening having a plurality of radially extending slots which communicate with the central opening. When aligned in a stator core, the central opening of the lamination plurality defines a central, rotor receiving bore and the slots define winding receiving receptacles. It is conventional to distribute the windings in the slots according to some predetermined distribution factor. In a 2 pole induction motor, for example, the windings would include a main winding part and an auxiliary winding part, each of which has a first pole and a second pole physically offset in relation to one another. Each pole is constructed from a plurality of coils of wire, each coil of wire being constructed from a plurality of individual wire turns. The wire coils include a generally straight conductor run portion of the wire turn is carried in the slots of the stator assembly, and an end turn portion of the wire turn which extends outwardly of the end laminations of the stator core, between respective ones of that wire turn part forming the straight conductor run portions of the coil.

The end turn portions of the motor windings long have been a problem area in motor construction. The end turns are not an important factor in flux generation but account for a relatively large part of the resistance loss exhibited by the motor winding. Ideally, the end turns are made as small as possible. The end turns often are subjected to various blocking processes designed to compact the wire mass of the end turns into some predetermined silhouette so that the overall motor dimensions meet a particular application's dimensional requirements.

Since the motor over temperature device generally is placed between the windings after all other motor constructional steps are completed, some provisions must be provided to permit the later insertion of the protection device.

One form of motor protector finding wide application is available from Texas Instruments Incorporated under the trademark KLIXON. In particular, the device is a bimetallic sensor designed to separate or cause an open circuit in the motor winding when an over temperature condition is sensed in that winding. The actual protector operative elements are enclosed in an irregular shaped, metal outer casing. In the past, it has been conventional to use some type of insulative material, available from the E. I. DuPont de Nemours & Company under the trademarks MYLAR and NOMEX, for example, to form a thermostat strap for later reception of the protecting device. In general, these materials are relatively flexible. They are, however, good insulators, an important factor in view of the fact that the windings and outer casing both are metallic materials.

Use of MYLAR and NOMEX thermostat straps, however, has been plagued with difficulties. In the first place, the material itself tends to be relatively expensive, especially when the thermostat strap must be formed individually, which generally is the case. Because prior strap devices were constructed from flexible material, they often compressed during end turn blocking, making the later insertion of the protector difficult. Even when compression of the thermostat strap does not occur, blocking or other manufacturing processes often cause the position of the prior art thermostat straps to shift. It is difficult, if not impossible, to reposition the strap in its proper position after the motor construction is completed. For example, it is common to immerse or coat the stator assembly and motor winding in a suitable epoxy varnish. After cure, the strap cannot be moved without destroying the stator assembly. Position of the thermostat strap is important in the operation of the protecting device. The thermostat, protector or protecting device, terms used synonymously in this specification, operation depends in part on the fact that the protector is in close proximity to a large number of the end turns of the coils forming the winding. That proximity permits the protector to follow any temperature change in the winding closely, and to open the motor circuit if the temperature change becomes excessive.

Motors utilizing motor protectors sometimes are mounted in applications or transported in an inverted attitude so that means for counteracting gravitational or other forces must be provided in order to prevent the protector from falling from the thermostat strap. Thermostat straps having such means are known in the art, but they have been difficult to manufacture and their operation has been time consuming in that each protector must be locked in place individually following its insertion in the thermostat strap.

Our invention eliminates these prior art deficiencies by providing a molded thermostat strap having a generally semi-rigid construction. The thermostat strap includes a central well having releasable locking means associated with it, which automatically engages the protector upon insertion in the well, locking the motor protector in position. The strap also includes means insertable in the slots of the stator core for preventing the shifting of the strap during blocking or other motor construction steps. Because the device is semi-rigid, it does not crush during end turn blocking. The strap includes a central well having strap wings extending outwardly from it. The wings preferably are formed with a predetermined radius of curvature so that the strap tends to conform to the end wire configuration. The ability to preform the strap wings reduces the possibility of the thermostat strap being forced from the winding during blocking. Strap construction is facilitated in that the strap may be manufactured utilizing mass production plastic molding techniques.

One of the objects of this invention is to provide a low cost thermostat strap for use with dynamoelectric machines.

Another object of this invention is to provide a thermostat strap having means for releasably securing a motor protector to the strap.

Yet another object of this invention is to provide a thermostat strap including means for preventing shifting of the strap.

Yet another object of this invention is to provide a thermostat strap having a semi-rigid construction.

Still another object of this invention is to provide a thermostat strap having a central well with wings extending outwardly from and on opposite sides of the well, the wings having a predetermined radius of curvature imparted to them.

Other objects of this invention will be apparent to those skilled in the art in light of the following description and accompanying drawings.

SUMMARY OF THE INVENTION

In accordance with this invention, generally stated, a thermostat strap is provided with means for automatically locking and releasably engaging an associated thermostat, and means for maintaining the strap position in relationship to the winding of a dynamoelectric machine. In the preferred embodiment, the strap is constructed from a semi-rigid material and includes a central well area for receiving the thermostat. A pair of wings extend outwardly from opposite sides of the central well. The wings are formed along a predetermined radius of curvature to aid in placing and maintaining the strap in a desired location. The well has the locking means integrally formed in it. Preferably, the locking means is self-biased towards the locked position by the natural resiliency of the material forming the thermostat strap. The particular strap position maintaining means disclosed includes at least one leg insertable in a slot of a stator core for a dynamoelectric machine.

BRIEF DESCRIPTION OF THE DRAWINGS

In the drawings,

FIG. 3 is a view in perspective of the motor protection device shown in FIG. 1;

FIG. 4 is a top plan view of the device shown in FIG. 3;

FIG. 5 is a view in side elevation of the device shown in FIG. 3; and

FIG. 6 is a sectional view taken along the line 6—6 of FIG. 5, the protector shown in FIG. 5 being illustrated by phantom lines for drawing simplicity.

DESCRIPTION OF THE PREFERRED EMBODIMENTS

Figure 1:
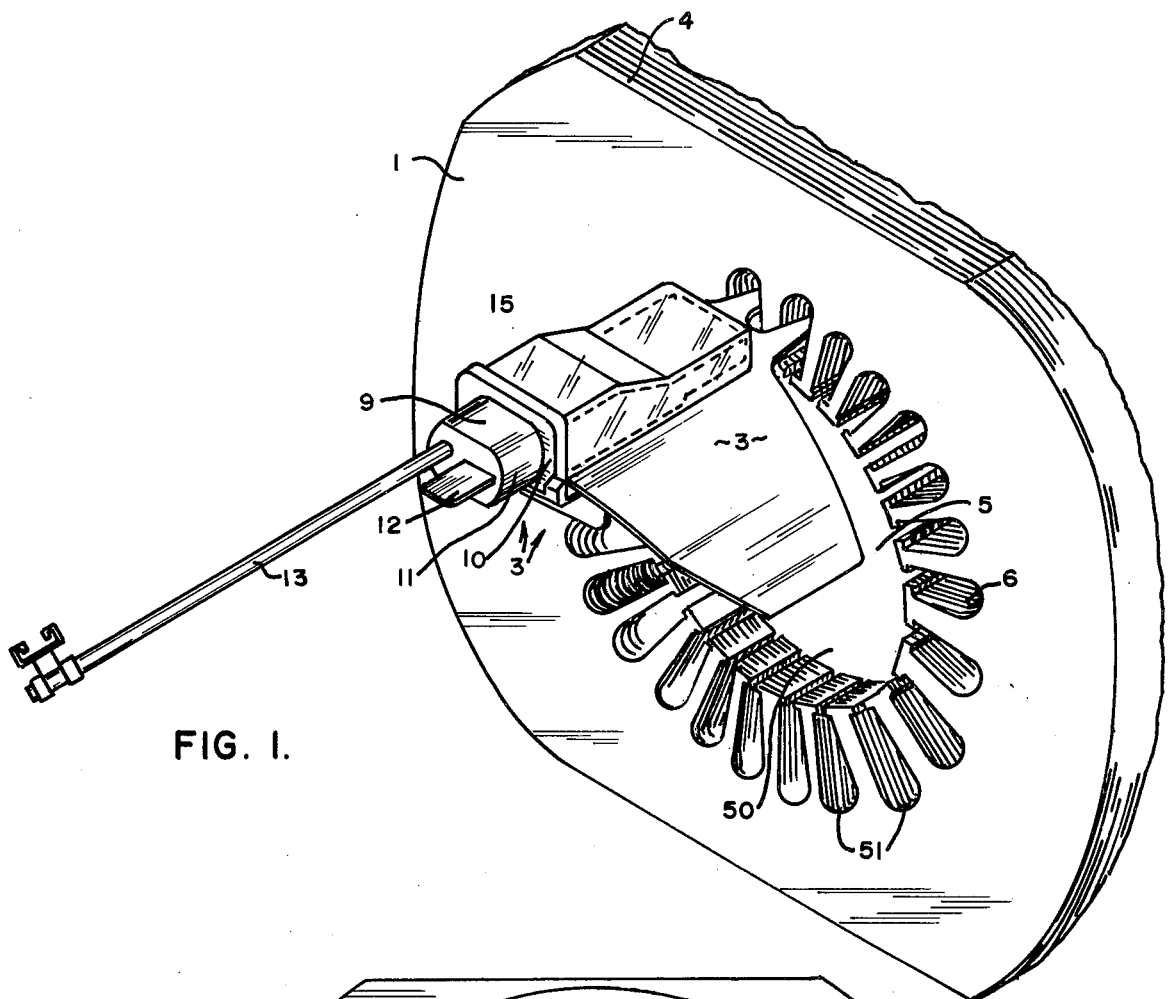
FIG. 1 is a view in perspective, partly broken away, illustrating the application of a preferred embodiment of motor protection device of our invention.

Referring now to FIG. 1, reference numeral 1 indicates a core of a stator assembly 2 having one illustrative embodiment of motor protection device 3 of our invention associated with it. The protection device 3 is described in greater detail hereinafter.

The core 1 of the stator assembly 2 generally is constructed from a plurality of individual laminations 4. Each of the laminations 4 has a central opening 5 and a plurality of openings 6 extending radially outwardly from the opening 5. The openings 6 communicate with the central opening 5 on their first end are closed at their second end. The laminations 4 are aligned so that the central opening in the laminations define a bore 50 and the openings 6 define axially extending winding receiving receptacles 51. The laminations are secured to one another by any convenient means. Welding, cleating, or adhesive bond, singly or in various combined forms are common expedients used in manufacturing the core 1 from the lamination plurality.

Figure 2:
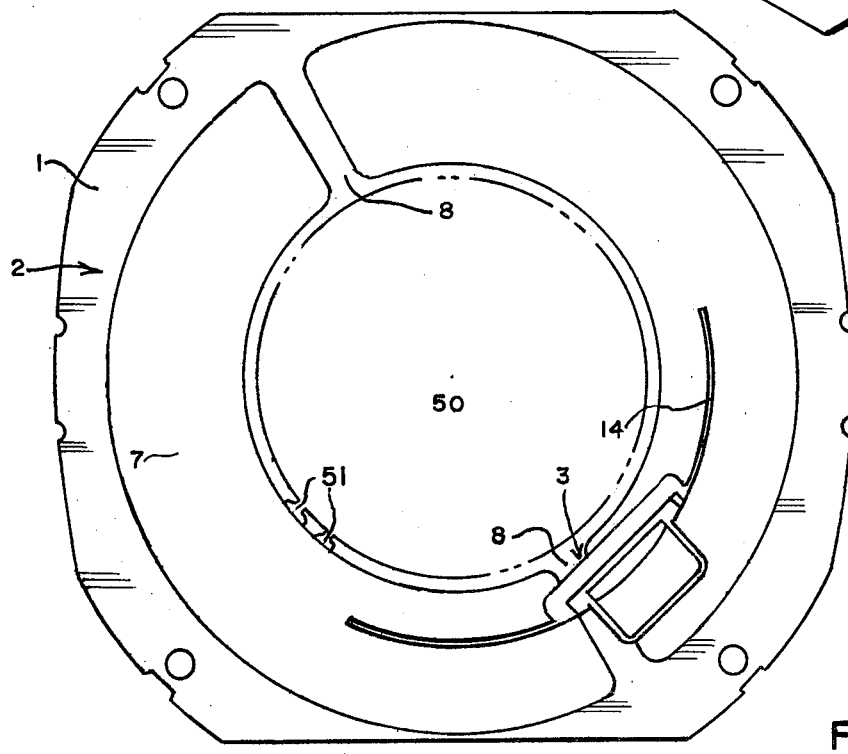
FIG. 2 is a top plan view illustrating placement of the motor protection device shown in FIG. 1.

The windings, generally indicated by the numeral 7 in FIG. 2, commonly include a main winding and an auxiliary winding. In the embodiment illustrated, the main winding is a two pole design, each of the poles being constructed from a plurality of coil segments which are in turn formed from a plurality of individual wire turns. As will be appreciated by those skilled in the art, the auxiliary winding for the embodiment illustrated also is a two pole winding, each of the poles being constructed from a plurality of coil segments which are in turn formed from a plurality of individual wire turns. The auxiliary winding, however, conventionally is physically displaced with respect to the main winding, so that the center of each auxiliary pole formed from the auxiliary winding coil segments is positioned approximately at the splits between the poles of the main winding, the splits being indicated generally by the numeral 8 in FIG. 2.

The windings 7 usually are formed on a suitable winding machine, and then axially inserted through the bore 50 into the receptacles 51. In most instances, the main and auxiliary windings are inserted separately, although simultaneous insertion may be utilized in certain instances.

The stator assembly 2 has lead wires, not shown, electrically connected to the motor windings 7, which permit the stator assembly to be interconnected to a source of electric power. It is conventional to provide a protection device for opening at least one of the connections to the stator assembly. A protector or thermostat 9 generally is utilized for this purpose. A number of protector designs are available commercially, any of which are compatible with the broader aspects of our invention. One prevalent design utilized in conjunction with hermetic motors, for example, is manufactured under the trademark "KLIXON," by Texas Instruments Incorporated. A "KLIXON" protector design is illustratively shown in the drawings.

The protector 9 has an elongated body 10 having a connection end 11 adapted to receive a motor lead, not shown, along a male terminal 12 and to be electrically connected to a source of electrical power, not shown, along a conductor 13. The protector 9 has a flange 28 extending outwardly from the body 10, along the terminal connection end 11 of the protector 9. The protector 9 generally is a bimetallic, snap action device having a first bimetal part connected to the conductor 13 and a second bimetal part connected to the terminal 12. Because the metal body 10 is heat conductive, the bimetal parts are sensitive both to current drawn through the motor windings 7, and to the heat generated by the motor windings. The protector 9 is inserted between the main and auxiliary windings at or near the split 8 between the main winding poles.

Commonly, the protector 9 is inserted between the windings of certain motor types, for example, hermetic motors, by the original equipment manufacturers of the hermetic compressor. In this type of application, the motor manufacturer supplies the stator assembly 2 so that the protector 9 may be inserted at a later date. Provision for later protector insertion is accomplished by manufacturing the stator assembly 2 with a thermostat strap 14 inserted along a desired position in the windings 7.

A strap for receiving the protector 9 is an old expedient in motor manufacture. Our invention differs from devices known in the prior art by specific structural differences described in greater detail hereinafter.

Referring now to FIGS. 3 through 6, the strap 14 includes a main body area 15 formed to follow the contour of a particular protector 9 design. While the contour shown is that of the particular protector 9 previously described, those skilled in the art will recognize that other protecting devices are compatible with the broader aspects of our invention. The main body area 15 generally is an elongated structure having a pair of oppositely opposed side walls 16, a front wall 17, a back wall 18, a bottom wall 35, and an open top. The walls 16 through 18 and 35 define a thermostat well 19 sized to receive the body 10 of the protector 9.

A pair of wings 20 and 21, respectively, extend outwardly from the main body area 15. The preferred embodiment of the thermostat strap 14 is a molded plastic part, constructed from any one of a number of suitable materials. Because of its molded construction, the strap 14 is easy to manufacture in large, production run quantities. More importantly, because it is a molded part, the wings 20 and 21 may be performed along a selected radius of curvature, indicated by the symbol "R" in FIG. 4. The radius of curvature of the wings enable the strap 14 to conform to the general contours of the windings 7 and to be less susceptible to movement during manufacturing steps conducted after strap 14 placement between the windings 7. One of the later manufacturing steps accomplished after strap 14 placement, in hermetic motor construction, is the application of "lacing" to the motor end turns. The lacing is wrapped around the end turns and prevents, among other things, the displacement of a single wire from the remainder of the end turn mass. The wings 20 and 21 are useful in permitting the strap 14 to be laced in position. That is to say, the relatively broad angular expanse of the wings ensures that the strap 14 will be encompassed by several strands of the lacing. The relative dimensions of the wings 20 and 21 may vary in other embodiments of our invention.

The main body area 15 includes a projection 22 defined by a surface 23 which extends perpendicularly outwardly from a plane defined by the back wall 18. Surface 23 has a locking means 24 integrally formed with it. Locking means 24 includes a rectangular wall 25 having a pair of tabs 26 extending outwardly from it. The tabs 26 extend toward the well 19. The tabs 26 preferably have a canted outward edge 40 and a generally flat, bottom edge 41. As may be seen in FIG. 6, the tabs 26 are spaced from an upper end 27 of the well 19 for a distance sufficient to permit the tabs to receive the flange 28 of the protector 9 along its height dimension. As indicated, the strap 14 preferably is a molded plastic structure. The natural resiliency of the plastic material, and the canted edge 40, permit the protector 9 to be inserted past the tabs 26 so that the edge 41 projects over a top area 42 of the flange 28, locking the protector 9 within the well 19 after protector insertion within the well. Because of the integral construction of the wall 25 and the surface 23, the surface 23 functions as a lever arm, permitting protector removal from the well 19, if desired. That is, a downward force, downward being referenced to FIG. 6, may be applied to the surface 23 to disengage the tabs 26 from the flange 28 of the protector 9, thereby allowing the removal of the protector 9. Upon cessation of any applied force, the natural resiliency of the strap 14 material enables the tabs 26 to assume their original position. As thus described, the locking means 24 automatically engages the protector 9 upon protector 9 placement in the well 19, while simultaneously permitting easy removal of the protector. The one step insertion-locking feature is particularly helpful to original equipment manufacture in that the time consuming procedure for holding protectors prevalent in prior art thermostat strap designs is eliminated.

The strap 14 also has a pair of legs 29 and 30, respectively, integrally formed along the bottom edge of the wing pair 20 and 21, bottom being referenced to FIG. 5. The legs 29 and 30 shown are triangular in plan, having a pointed lower end 31 and a broad base 32 integrally constructed with the wings. Other leg designs will occur to those skilled in the art. The ends 31 of each of the legs 29 and 30 are spaced from one another for a distance 33 which generally is predeterminedly selected so that the distance 33 corresponds to the distance between respective ones of successive pairs of the openings 6 in the core 1. The legs 29 and 30 are designed so as to permit them to enter the openings 6 in the core when the strap 14 is placed in the stator assembly 2. Once the legs 29 and 30 enter the openings 6, they effectively hold the location of the well 19 and prevent shifting of the strap 14 during later constructional steps necessary to complete stator assembly 2 manufacture. While we prefer the use of leg pairs for insertion in the openings 6, those skilled in the art will recognize that one or more of the legs inserted in the openings 6 will function to maintain position of the strap 14. The leg pair design shown is an economic compromise that works well in actual practice. The relative location of the legs 29 and 30 with the respect to the main body area 15 of the strap 14 may vary. The opening 6 size and location of the winding split 8 are among the factor that influence the relative location of the legs and main body area.

The front wall 17 of the main body area 15 may have a strengthening rib 34 integrally formed in it, if desired. Although the material from which the strap 14 is constructed usually provides sufficient structural rigidity to the well 19 so that the well generally retains the original size, even though the wall 17 is subjected to forces from later end turn blocking steps, the rib 34 may be desirable in some applications and is shown for that reason.

It thus will be apparent that a thermostat and motor protector combination meeting all the ends and objects herein set forth above is provided. As will be understood by practioners in the art, one or more subcombinations of the motor protector and thermostat strap of our invention may be utilized independently of one another. This is contemplated and intended by the appended claims.

Numerous variations, within the scope of the appended claims, will be apparent to those skilled in the art in light of the foregoing description and accompanying drawings. Thus, the design silhouette of the thermostat strap illustrated in the drawings may vary in other embodiments of this invention. The number and location of the legs 29 and 30 also may be varied, as may the radius of curvature and size of the wings 20 and 21. As indicated above, a single leg will function to aid in the position maintenance function of the legs. While a particular protector device is illustrated in the drawings, other motor protection means are compatible with the broader aspects of our invention. These variations are merely illustrative.

Having thus described the invention, what is claimed and desired to be secured by Letters Patent is:

1. A device for use in a motor having a stator assembly, said stator assembly including a core having a plurality of winding receiving slots formed in it, comprising:
   a molded part having at least one side wall defining a receptacle well in the molded part, the molded part having a main body area, said receptacle well being located in said main body area;
   means for releasably locking a protecting device in said receptacle well including at least one locking tab integrally formed along said main body area, said locking tab being mounted for movement between a first position for holding the protecting device in said receptacle well, and a second position for releasing the protecting device, said locking tab being biased toward said first position; and
   means for positioning said molded part with respect to the slots of said stator assembly, said positioning means being inserted in the winding receiving slots of said stator assembly.

2. The device of claim 1 wherein said positioning means comprises at least one leg extending downwardly from said molded part, said leg being sized to permit its reception in one of the winding slots of said stator assembly.

3. The device of claim 2 wherein said locking means is self biased.

4. In an electric motor including a stator assembly, said stator assembly having a core constructed from a plurality of individual laminations of magnetic material, each of said laminations having a central bore opening and a plurality of winding receiving slots extending radially outwardly from said central bore opening, and windings in said slots, the improvement comprising a thermostat strap insertable between said windings, said thermostat strap including a main body area, said main body area being defined by at least one side wall, said side wall delineating a receptacle well, said receptacle well adapted to receive a motor protector, means for releasably locking the motor protector in said receptacle well, said locking means being integrally formed with said main body area, said locking means including a first wall extending outwardly from said main body area, and a pair of tabs extending approximately normally from said first wall, each of said tabs having a canted outward end and a generally flat bottom edge, and means for maintaining the position of said thermostat strap with respect to said windings, said position maintaining means including at least one leg extending outwardly from said thermostat strap, said leg being insertable in a slot of said stator assembly.

5. The improvement of claim 4 wherein said locking means is self-biased.

6. The improvement of claim 5 further characterized by at least one wing member extending outwardly from said main body area, said wing member having a predetermined radius of curvature imparted to it.

7. The improvement of claim 6 further characterized by a second wing member, said main body area being centrally located between respective ones of said wing members, said wing members being semi-rigid, each of said wing members having a predetermined radius of curvature associated with them.

8. A device for a motor having a stator assembly, said stator assembly including a core having a plurality of winding receiving slots formed in it, and windings in said slots, comprising:
   a molded part having a main body area, said main body area having at least one side wall, said side wall defining a receptacle well along said main body area;
   means for releasably locking a protecting device in said receptacle well, said locking means comprising at least one locking tab integrally formed with said molded part, said locking means being mounted for movement between a first position holding said protecting device in said receptacle well, and a second position for releasing said protecting device, said locking tab being biased toward said first position; and
   means for positioning said molded part with respect to the windings of said stator assembly, said positioning means being insertable in the winding receiving slots of said stator assembly.

9. The device of claim 8 wherein said positioning means comprises at least one leg extending downwardly from said molded part, said leg being sized to permit its reception in one of the winding receiving slots of said stator assembly.

10. In an electric motor including a stator assembly, said stator assembly having a core constructed from a plurality of individual laminations of magnetic material, each of said laminations having a central bore opening and a plurality of winding receiving slots opening into and extending radially outwardly from said central bore opening, and windings in said slots, the improvement which comprises a molded thermostat strap insertable between said windings, said thermostat strap having a main body area, said main body area including at least one side wall defining a receptacle well adapted to receive a protector, and means for maintaining the position of said receptacle well with respect to said windings, said position maintaining means including at least one semi-rigid leg extending outwardly from said thermostat strap, said leg being sized for reception in a slot of said stator assembly, said leg being positioned in said slot when said thermostat strap is inserted between said windings.

11. The improvement of claim 10 including means for locking a protector in said receptacle well, said locking means comprising at least one locking tab integrally formed along said main body area, the locking tab of said locking means being mounted for movement between a first position adapted to hold the protector in said receptacle well and a second position for releasing the protector, said locking tab being biased toward said first position.

* * * * *